Figure 1:
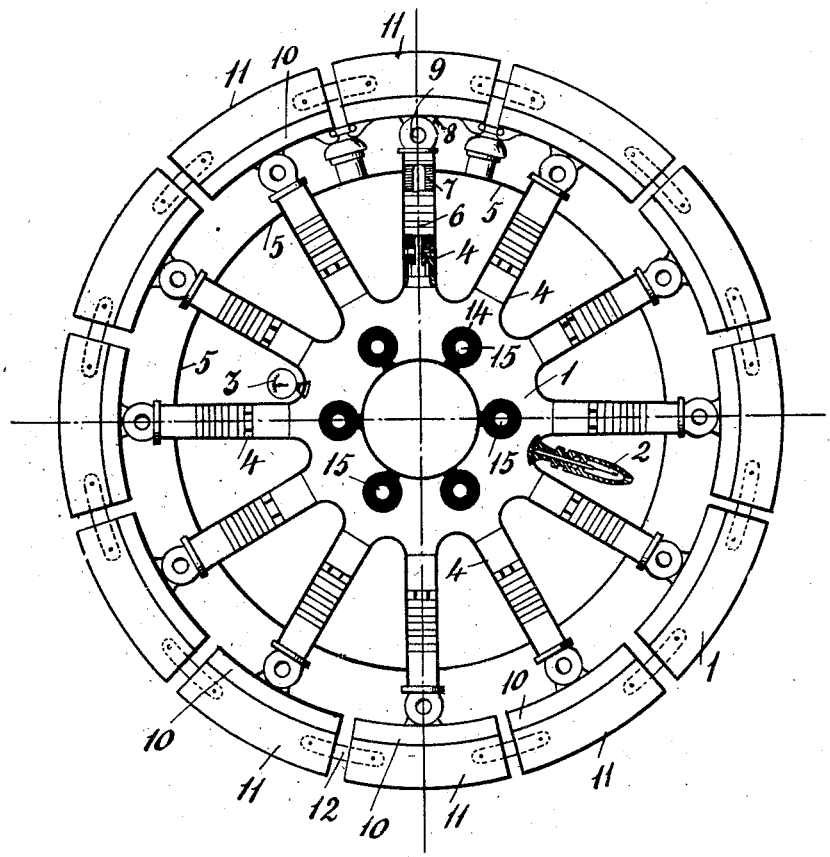

F. PERSONÉ.
PNEUMATIC WHEEL.
APPLICATION FILED JULY 13, 1915

1,210,357.

Patented Dec. 26, 1916.
2 SHEETS—SHEET 1.

Inventor
F. Personé
by Jno. Imirie
Atty.

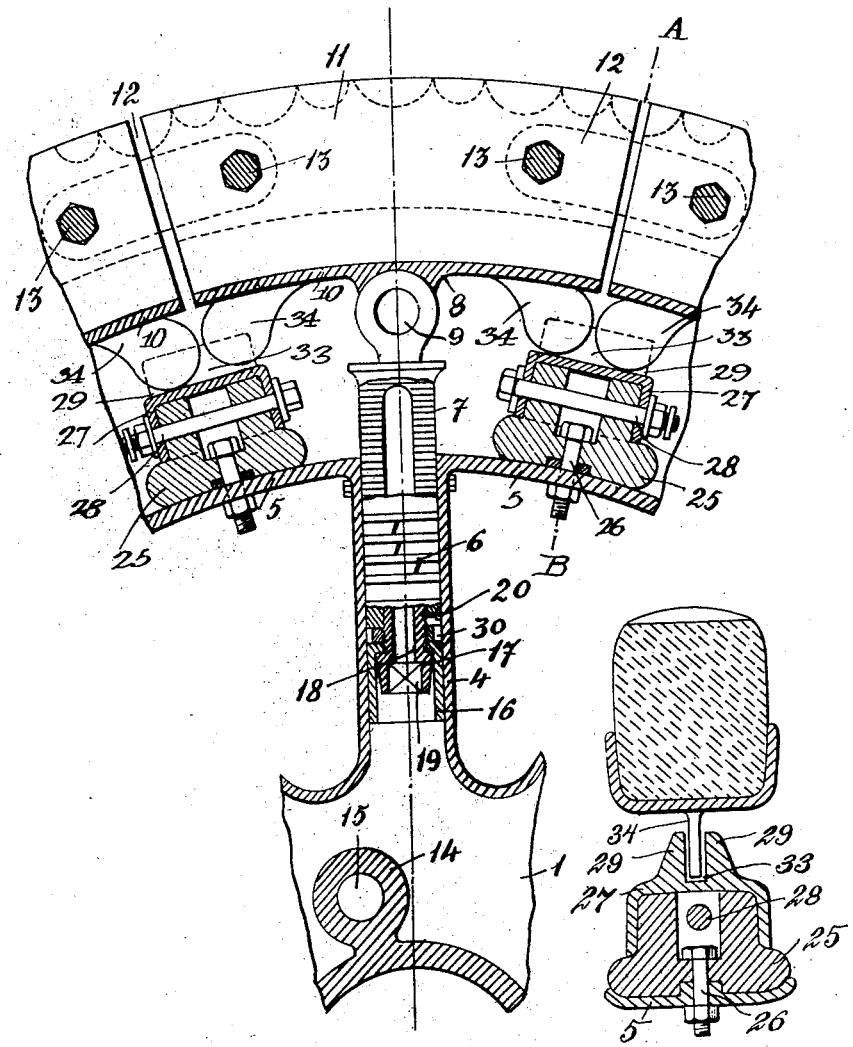

UNITED STATES PATENT OFFICE.

FRANCESCO PERSONÉ, OF NARDO, ITALY.

PNEUMATIC WHEEL.

1,210,357.

Specification of Letters Patent.  Patented Dec. 26, 1916.

Application filed July 13, 1915.  Serial No. 39,683.

*To all whom it may concern:*

Be it known that I, FRANCESCO PERSONÉ, a subject of the King of Italy, and residing at Nardo, Province of Lecce, Italy, have invented certain new and useful Improvements in Pneumatic Wheels, of which the following is a specification.

The invention relates to resilient wheels for motor-cars and other vehicles and of that class in which resiliency is obtained through the agency of compressed air stored in a hollow center or hub portion and adapted to act on the wheel rim made in sections, by aid of plungers connected to these rim sections, and the object of the same is to improve a wheel of this construction. These improvements are intended to furnish a simple and firm and stable wheel construction, to insure a constant and maximum resiliency for any part of the rim or for every rim-section, to limit the extent of the oscillations of the rim-sections and to provide for these rim-sections being supported from the rigid part of the wheel, also for reducing as far as possible the wear. With these objects in view, the center or hub portion containing the compressed air, is cast in one piece with the wheel spokes and with a ring connecting these said spokes, and it has cast on it, lugs for fastening it to the wheel axle, these parts forming thus one whole which is the rigid part of the wheel; the spokes are hollow and serve as cylinders for the plungers, connected to the rim-sections, to work in; the plungers are hollow and are made in one piece with the plunger rods which have the same cross-section as the plungers and as the cylinder spokes, and they carry the rim-sections and also easily detachable leather caps; each rim-section has provided for it an elastic india-rubber support interposed between the respective rim-section and the connecting ring; the rim-sections are covered with india-rubber segments which are not fastened thereto, but are interconnected by means of straps and bolts.

The construction of the center or hub portion allows a particularly simple structure of the wheel, the formation of the plungers and the provision of the air pump insure a very firm and stable structure and the required resiliency of the wheel, the india-rubber supports limit the extent of the oscillations of the rim-sections, and the arrangement of the india-rubber tire-sections permits their being easily interchanged and to diminish the wear on the other parts of the wheel.

In order that the invention may be readily understood, the same will here be described, by way of example, with reference to the annexed drawings, in which—

Figure 1 is a side elevation of the wheel, some of the parts being shown in section, Fig. 2 is a part sectional side elevation, Fig. 3 is a cross section of the supports for the rim-sections, taken on line A—B of Fig. 2.

The wheel comprises a center or hub portion 1, for example of cast steel. This center or hub portion is hollow and may have air compressed into it by means of an ordinary inflating valve 2, a pressure gage 3 being provided for controlling the air pressure within the center or hub portion.

The center or hub portion is fitted with radially projecting spokes 4 cast in one piece with it, these spokes being hollow cylinders which are turned and ground inside and which communicate with the center or hub portion. The spokes are interconnected at their outer ends by a ring 5, so that the center or hub portion and the spokes form one whole which is the rigid part of the wheel. The center or hub portion 1 has also cast in one piece with it lugs 14 which by aid of bolts or the like (not shown in the drawing) passing through holes 15 in the lugs, serve to fasten the center or hub portion 1 and therefore the whole wheel, for example, to a plate carried by the axle of the vehicle.

In each cylinder spoke 4 moves a snugly fitting plunger 6 having a plunger rod 7 of the same cross-section as the plunger and pivotally secured by means of a bolt 9 to the lug 8 of a segment-shaped section 10 covered with a solid rubber tire portion 11. The segment-shaped sections 10 form the periphery or rim, and the solid rubber portions 11 the tire of the wheel. These rubber-tire portions are not permanently attached to the rim-sections, but are arranged in grooves thereon and are interconnected by means of elongated plates or straps 12 and bolts 13.

In order to secure the air-tight fitting of the plungers 6, it is advisable to use plungers of the spring piston type, these plungers being hollow inside and provided at their inner end with a cap 16 of leather or other suitable material. The cap 16 is fastened to the plunger by aid of a screwthreaded sleeve 17 engaging a thread 18 inside the plunger body.

The sleeve 17 is hollow inside and has a head 19 with a square cavity, so that it may be screwed in with an ordinary key. It holds the cap 16 in place by pressing it against a hexagon nut 30 inserted between the inner end of the plunger 6 and the head 19 of the sleeve. A flat-headed screw 20 is provided for locking the sleeve in the desired position and for preventing its becoming loose.

When the wheel is running, the various rim-sections 10 oscillate about their axes 9. To limit the extent of these oscillations, elastic bearings or supports are provided which connect each rim-section with the ring 5 of the center portion. The elastic bearing or support comprises a hollow cylindrical member or buffer 25 of india-rubber, which is fastened to the ring 5 by means of a bolt and nut 26 and carries a cap 27 of iron or like material.

The buffer 25 consists of two parts and the part near the ring 5 is of larger cross-section than the remainder of the buffer. The head of the bolt 26 is preferably made to enter a cavity on the buffer 25 so as to leave the remainder thereof free.

The cap 27 consists of a hollow iron cylinder, into whose cavity the smaller part of the buffer 25 is forced and the cap is secured to the buffer by means of a bolt 28 with nut, washer and pin, which passes through holes in the cap and the buffer. The upper part of the cap 27 is provided with two lips or wings 29 forming a cavity or groove 33. The buffer is arranged opposite the divisional line between two neighboring rim-sections and these latter carry lugs 34 which may enter the grooves 33 and bear on the cap 27.

There is thus provided on the ring 5 an elastic bearing or support for each rim-section, which prevents excessively wide oscillations of the rim-sections about their axes 9 and also that the stress on the plungers should be too heavy, but this bearing or support does in no way interfere with the resiliency of the wheel. By this device, there are two bearings for each rim-section, one to the right and one to the left of the plunger.

What I claim is:

In a wheel, the combination of the hub, hollow spoke sections extending from the hub, a channel rim supported on the hollow spoke sections, an outer rim formed in sections and fitting in the channel of the inner rim, links pivotally connecting adjacent outer rim sections, a spoke portion pivoted to each section of the outer rim and fitting in the hollow spoke portions of the inner rim, means forming a cushion between the spoke portions, each section of the outer rim having a depending lug at opposite ends, cushions secured in the channel of the inner rim, there being a cushion located below the meeting ends of each pair of sections of the outer rim, each cushion comprising a hollow resilient body and a cap fastened thereto, the lugs on the sections engaging said cap.

In testimony whereof I have signed my name in the presence of two subscribing witnesses the 21st day of June, 1915.

FRANCESCO PERSONÈ.

Witnesses:
 ALFREDO CAMAJO,
 GIULIO CIGNI.